3,324,638
WINDROWER SICKLE DRIVE
Earl E. Koch, Mohnton, and Lawrence M. Halls and Horace G. McCarty, New Holland, Pa., assignors to Sperry Rand Corporation, New Holland, Pa., a corporation of Delaware
Filed July 9, 1964, Ser. No. 381,404
1 Claim. (Cl. 56—23)

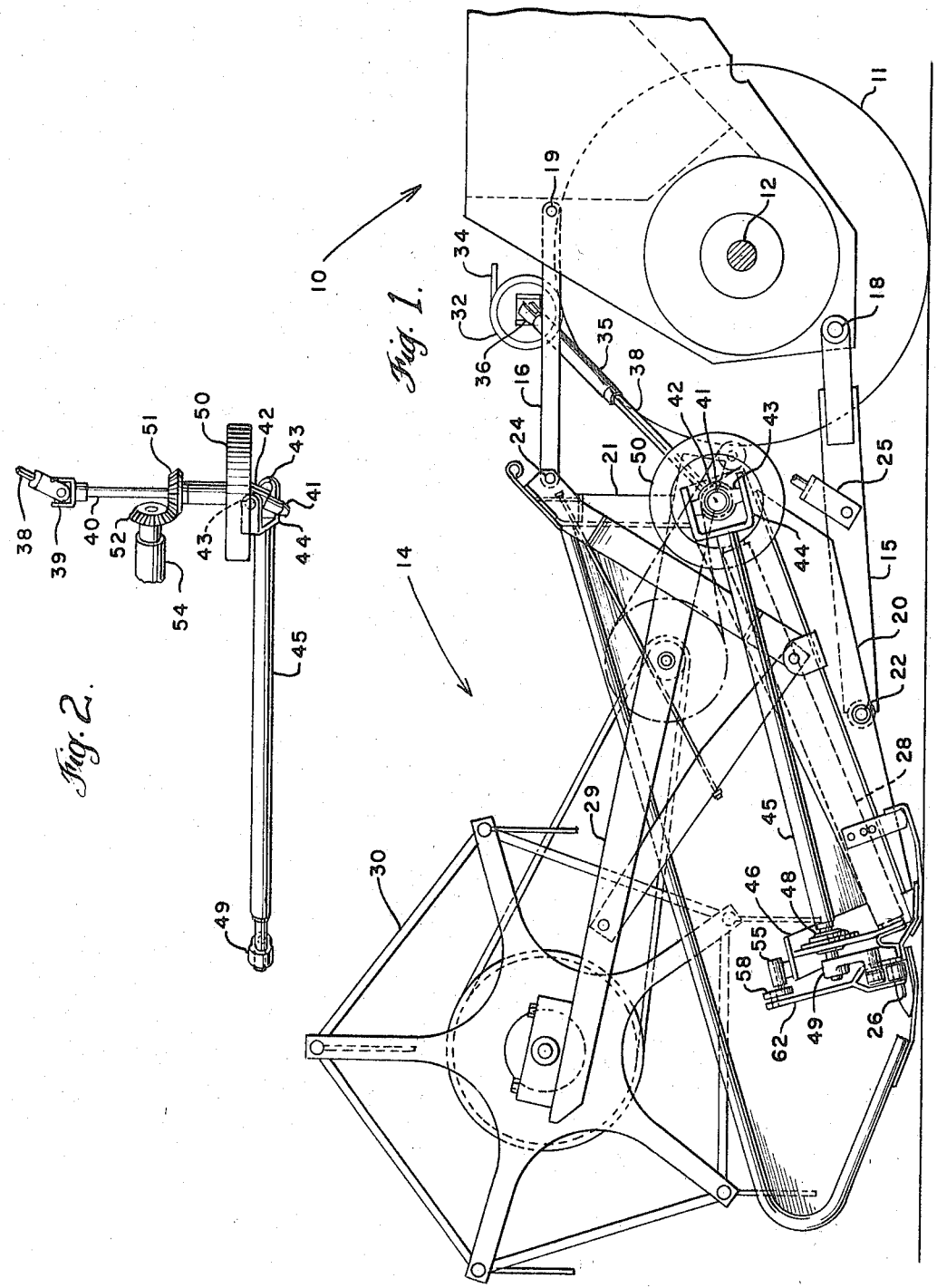

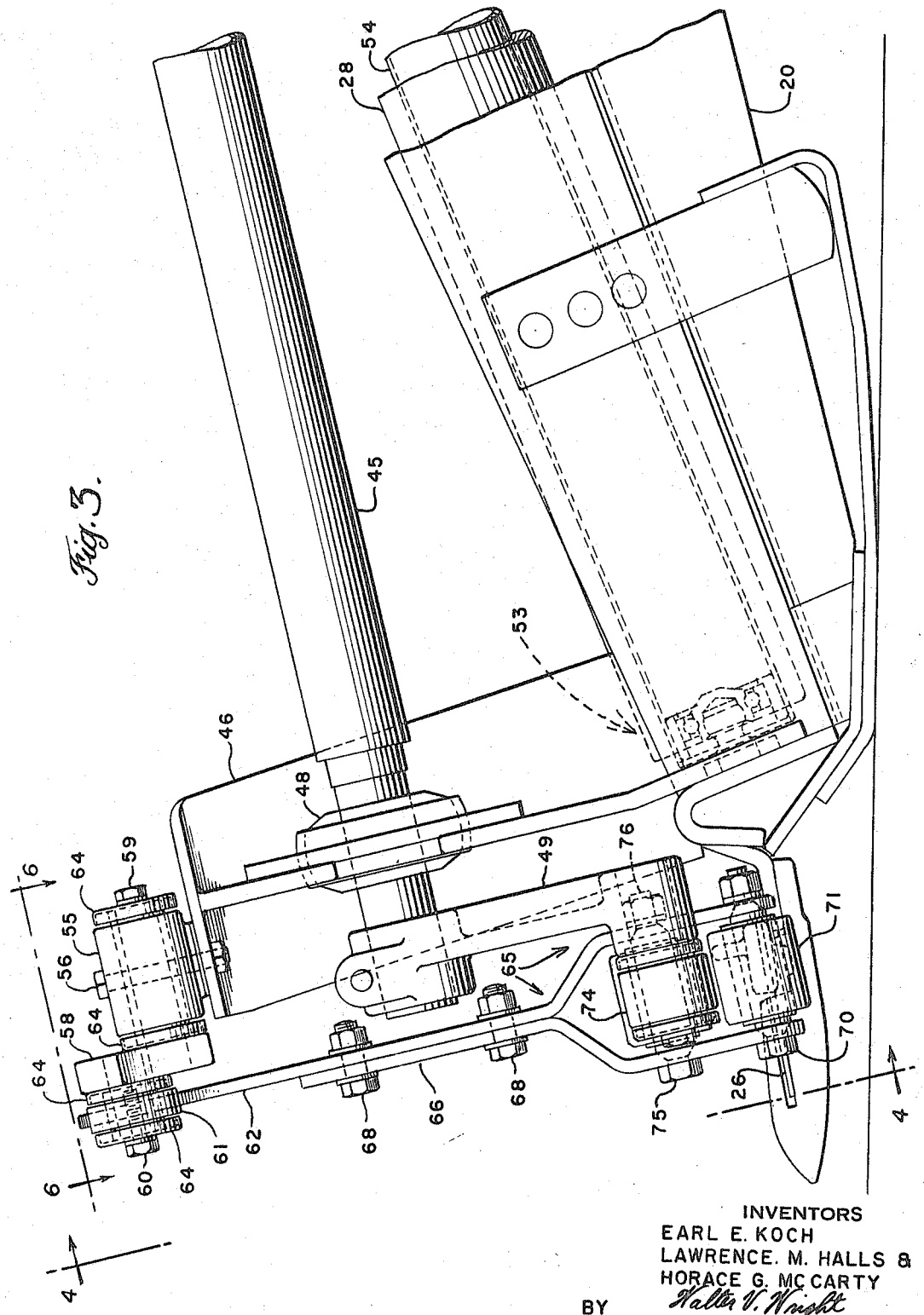

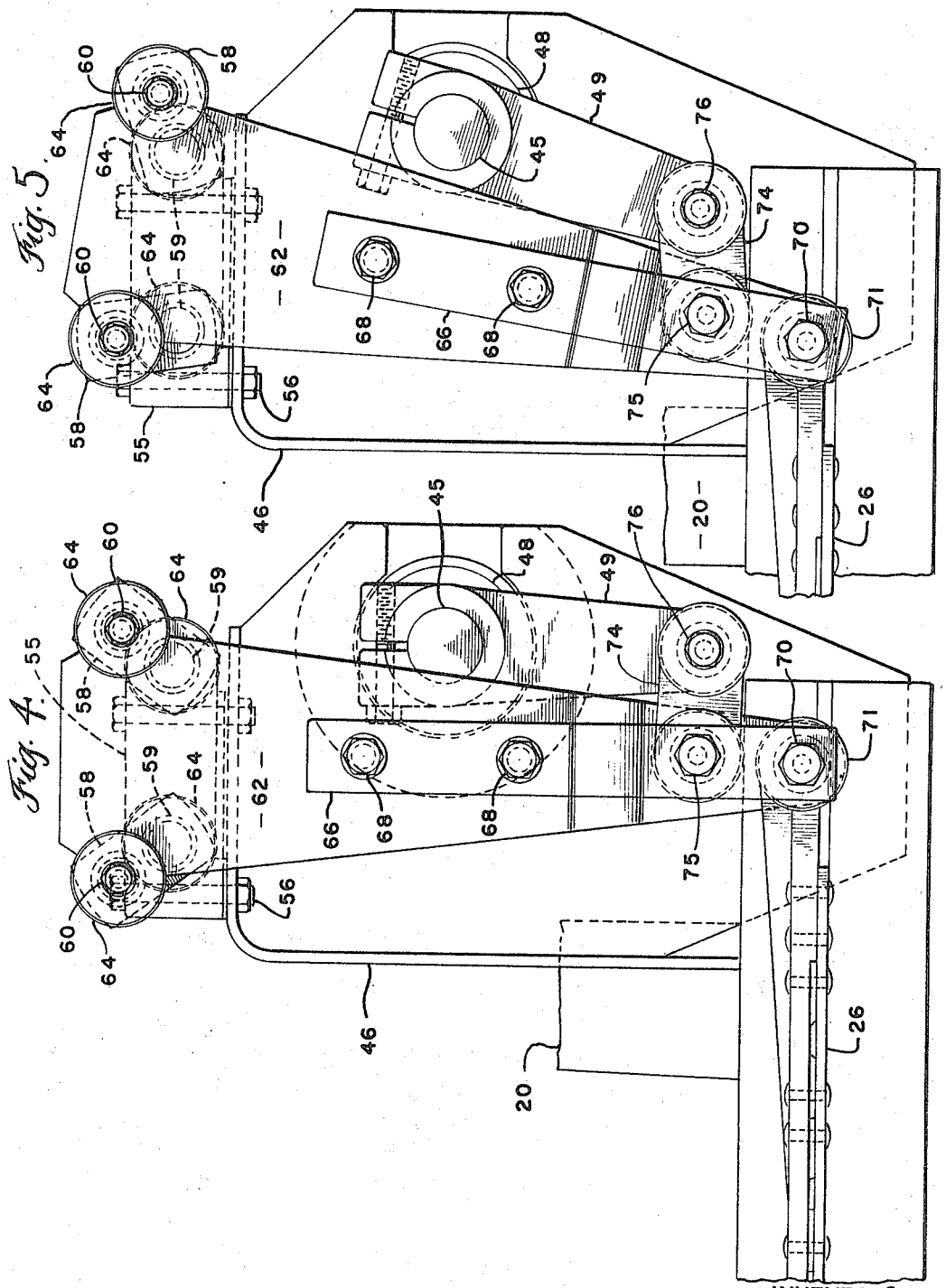

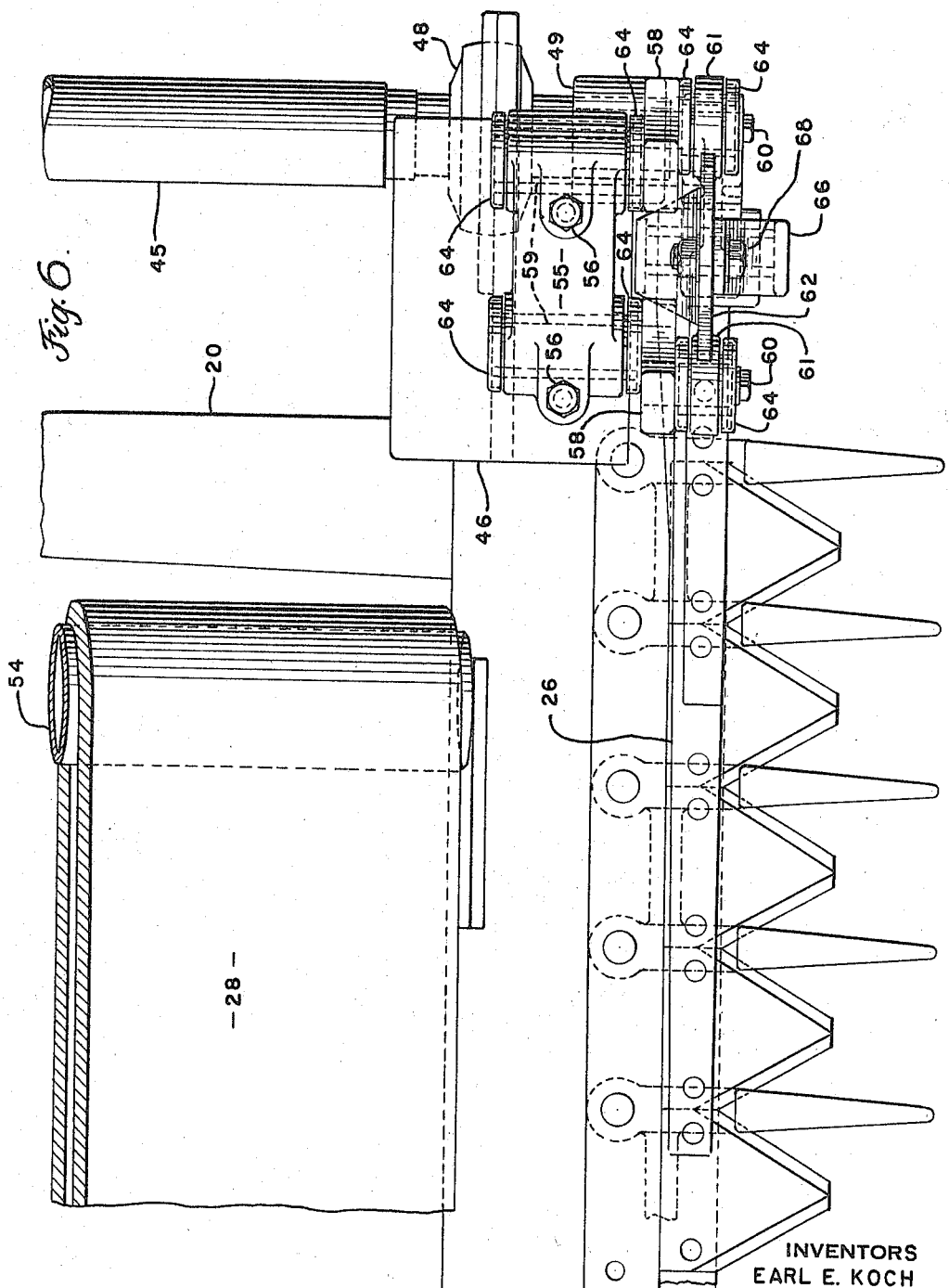

This invention relates to windrowers, or swathers, and is particularly concerned with novel mechanism for driving the sickle bar of a windrower header.

Windrowers, or swathers, comprise a tractor unit on which is carried a header unit and sometimes a crop conditioner unit, such as a crimper or crusher. The header unit functions to cut a wide swath of crop material and consolidate it into a narrow windrow. Various types of conveyors, such as augers or endless belts, are employed on headers to consolidate the wide swath into the windrow. Generally, a reciprocating sickle bar is provided at the front of the header to initially cut the crop.

It is the general object of this invention to provide novel mechanism for driving a windrower header sickle bar from the tractor unit.

It is another object of this invention to provide mechanism for driving a windrower header sickle bar in straight line reciprocation without the use of sliding guideways, thereby avoiding the wear and adjustment problems associated with sliding guideways and avoiding the introducduction of bending stresses into the sickle bar by the drive meechanism, as occurs in drives which swing in an arc.

It is another object of this invention to provide a solid positive drive train from a tractor unit to the sickle bar of a windrower header as opposed to the troublesome complex belt drive arrangements commonly found on windrower implements.

It is another object of this invention to provide a windrower header sickle bar drive wherein the sickle bar is easily disconnectable and removable from the header for sharpening or repair.

It is another object of this invention to provide in a windrower header a single beltless drive train which directly drives the windrower sickle bar in reciprocation and directly drives the windrower conveyor means in smooth continuous rotation.

These and other objects and advantages of this invention will be apparent upon reference to the following description and claim taken in conjunction with the accompanying drawings wherein:

FIG. 1 is a fragmentary elevational view of a windrower tractor unit and header having sickle bar drive means constructed in accordance with the principles of the present invention;

FIG. 2 is a fragmentary plan view of a portion of the drive train of the present invention showing the driving connection to the header conveyor means;

FIG. 3 is an enlarged fragmentary side elevational view of the sickle bar reciprocating mechanism visible in FIG. 1;

FIG. 4 is a fragmentary front view of the sickle bar reciprocating mechanism taken as indicated by the line 4—4 of FIG. 3 with the mechanism shown in mid-stroke;

FIG. 5 is a view similar to FIG. 4 but showing the mechanism in its position of moving the sickle bar to the left; and FIG. 6 is a plan view of the mechanism shown in FIG. 3 taken as indicated by the line 6—6 of FIG. 3.

Referring to the drawings in detail, particularly FIG. 1, the front portion of a windrower, or swather, tractor unit is indicated generally by the reference numeral 10. One of the tractor's traction wheels 11 is also visible along with the tractor front axle 12. A windrower header unit indicated generally by the reference numeral 14 is attached to the tractor unit 10 for vertical swinging movement on sets of header mounting arms 15 and 16 at each side of the header. The header mounting arms 15 and 16 are vertically swingable about pivot members 18 and 19, respectively, on the tractor unit 10. Header 14 has a frame structure comprising rigidly interconnected side frame members 20 and 21 at each side of the header interconnected by suitable rigid transverse frame members (not visible). The header frame is pivotally connected to supporting arms 15 and 16 by pivot members 22 and 24, respectively. Power mechanism on the tractor unit under the selective control of the vehicle operator operates through lift arms to raise and lower the header unit relative to the tractor unit. The lower portion of one of the lift arms is shown at 25 pivotally connected to lower header supporting arm 15.

Extending transversely across the front of the header near the ground is a reciprocable sickle bar 26. Behind sickle bar 26 and inclined upwardly and rearwardly therefrom is a transversely operating endless belt conveyor, or draper 28. At the upper front of the header unit, supported from the header frame on boom-like arms 29 is a reel 30. Reel 30, sickle bar 26, and draper conveyor 28 co-act in a manner well known in the windrower art to cut a wide swath of standing crops and consolidate the swath into a narrow windrow which is deposited back on the ground preparatory to subsequent harvesting operations such as conditioning or baling.

The present invention is particularly concerned with the drive train which transmits straight line reciprocating driving power to the sickle bar and rotary driving power to the draper conveyor from power-take-off mechanism on the tractor unit. A pulley 32 is journalled at the front center of tractor unit 10. An endless belt 34 transmits driving power to pulley 32 from the engine of the tractor unit. An outer sleeve portion 35 of a two-piece telescoping shaft is connected by a universal joint 36 to the shaft of pulley 32. Slidably received within sleeve shaft member 35 is an inner shaft member 38 having a cross sectional configuration other than round in order that torque may be transmitted between the sleeve shaft portion 35 and the inner shaft portion 38.

Referring now to FIG. 2, the inner shaft portion 38 is connected by a universal joint 39 to a header drive shaft 40. The drive shaft 40 is journalled on header frame members and extends transverse to the direction of travel of the unit. When the header is removed from the tractor unit, the shaft portion 38 slides out of sleeve shaft portion 35. Thus, the sleeve shaft 35 and pulley 32 constitute a part of the power-take-off mechanism of the tractor unit while the inner shaft portion 38 is a part of the header unit drive mechanism. The short drive shaft 40 is disposed adjacent one side of header 14 and projects laterally beyond the outer side of header side frame member 20. At the extreme outer end of drive shaft 40 is an angular crank arm 41 on which a sleeve 42 is journalled. Upon rotation of drive shaft 40 and angular crank member 41, an axis through sleeve 42 perpendicular to the axis of crank arm 41 moves with an oscillating, or wobbling, motion about an axis perpendicular to the axis of shaft 40. Such drives are commonly known as wobbler drives. The axis through sleeve 42 which oscillates, or wobbles, is the axis of the pivot pins 43 of a yoke, or wobbler drive transmitting member, 44. The pivot pins 43 are carried by the sleeve 42 and are journalled in yoke member 44. The axis perpendicular to the axis of shaft 40 about which the wobbling motion occurs, is the axis of shaft 45 which carries wobbler drive transmitting member 44 at its rearmost end and extends forwardly therefrom along the outside of the header unit to a fixed support structure 46 (see FIG. 1) rigidly carried on header frame member 28 adjacent the forward end of shaft 45 and adjacent the one end of mower sickle bar 26. The forward end of shaft 45 is journalled in, and held in fixed position by, a bearing 48 mounted on the fixed support structure 46. A right angle crank arm 49 is rigidly carried on shaft 45 at the forwardmost end of the shaft. Thus, it will be seen from FIGS. 1 and 2 that the end result of rotation of drive shaft 40 is oscillation of crank arm 49 about the axis of shaft 45. A flywheel 50 is fixedly connected to drive shaft 40 on the inboard side of the wobbler drive mechanism 41–44. Behind the flywheel, or on the side of the flywheel toward the tractor unit, the driving power is that of substantially uniform rotation or torque transmission. A bevel pinion 51 is carried by drive shaft 40 behind flywheel 50. The bevel pinion 51 meshes with a bevel gear 52 which is keyed to the shaft of a draper conveyor supporting roller 54. Further mounting details of the particular draper conveyor driving roller 54, and the relative positions of the draper conveyor 28 and its driving roller 54 to the sickle bar and the drive train may be seen in FIG. 6 and at 53 in FIG. 3. Other than in the particular manner in which the draper conveyor is drivingly related to the sickle drive mechanism of the present invention, it is considered to be conventional.

Referring particularly to FIGS. 3–6, a double journal block 55 is fixedly attached by bolts 56 to the top of fixed support structure 46. A pair of rocker arms, each bearing the reference numeral 58, each have their lower ends journalled on bolt pivot members 59 (FIG. 3) which are carried by the respective journals in double journal block 55. The upper ends of the respective rocker arms 58 are pivotally connected by bolts 60 to ear-like journals 61 which are welded, or otherwise rigidly provided at the upper corners of a generally triangular shaped rocker member 62. As is best seen in FIGS. 3 and 6, dust covers 64 are provided to seal the bearing surfaces of all the journals.

The lower end of the triangular shaped rocker member 62 extends downwardly along the rear side of sickle bar 26. The lower portion of the rocker member is offset relative to the upper portion as indicated at 65 in FIG. 3. A front plate member 66 is rigidly but removably attached to rocker member 62 by bolts 68. The lower portion of front plate 66 is offset relative to the upper portion thereof whereby it extends downwardly along the front side of sickle bar 26. A nut and bolt connector 70 extends through the lowermost leg portions of the members 62 and 66 and also passes through a driving socket 71 which is disposed between the lower portions of members 62 and 66 and is rigidly attached to cutter-bar 26, as is best seen in FIGS. 4 and 5. The members 62 and 66 together constitute a two-piece rocker member which functions in operation as a single piece, but which may be separated by removal of the two bolts 68 to facilitate easy removal of the sickle bar from the header. It will be seen in FIGS. 4 and 5 that when rocker member 62 oscillates simultaneously on rocker arms 58, the bolt 70 connecting the lower ends of the rocker member 62 to sickle bar driving head socket 71 is driven in straight line reciprocation. The geometry of this rocker motion drive is more fully explained in U.S. Patent No. 3,113,412.

A link 74 (FIGS. 4 and 5), having one end pivotally bolted at 75 between the legs of rocker member 62–66 and the other end pivotally bolted at 76 to the radially outer end of previously described crank arm 49, completes the driving connection from the sickle bar back to the power-take-off means of the tractor unit.

From the above it will be seen that positive solid mechanical drive connections extend through the entire drive train from the power-take-off means on the tractor to the reciprocating sickle bar at the front of the header. The sickle bar is driven in straight line reciprocation from crank arm 49 on oscillating shaft 45, which is in turn oscillated by the wobbler drive mechanism 41–44 in response to continuous rotation of the header drive shaft 40. The flywheel 50 isolates the power fluctuations of the sickle bar to the oscillating or reciprocating portion of the drive train thereby enabling the bevel pinion 51 on drive shaft 40 to directly drive roller 54 of draper conveyor 28 through bevel gear 52 on the shaft of roller 54. It will be readily apparent that the accessibility of rocker member bolts 68 and 70 facilitate easy removal of the sickle bar, which may simply be pulled laterally from the header after removal of the bolts 68 and 70.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claim.

Having thus described our invention, what we claim is:

In a windrower header of the type having a frame structure, a sickle bar extending transversely across the front of the frame structure and conveyor means disposed generally between said sickle bar and the rear of said frame structure and operable to convey crop material cut by said sickle bar laterally toward the center of the header, mechanism for driving said sickle bar and said conveyor means from a tractor unit on which said header is mounted comprising, a drive shaft rotatably journalled on said frame structure at the rear thereof and having one end disposed at one side of said frame structure and the other end disposed inwardly toward the center of said frame structure, means on said other end of said drive shaft connectable in driven relation to power means on said tractor unit whereby said drive shaft may be rotatably driven from said tractor unit, wobbler drive means on said drive shaft at said one end thereof, a second shaft journalled on said frame structure at said one side thereof and extending forwardly from said wobbler drive means to said sickle bar, a wobbler drive transmitting member on the rearmost end of said second shaft and connected in driven relation to said wobbler drive means to oscillate said second shaft about its own longitudinal axis in response to rotation of said drive shaft, a crank fixed on said second shaft at the forward end thereof for oscillation with said second shaft, a rotary driving member fixed on said drive shaft for rotation therewith and spaced laterally inwardly from said wobbler drive, drive means extending rearwardly from said conveyor means to said drive shaft and connected in driven relation to said rotary driving member, a flywheel on said drive shaft between said wobbler drive and said rotary driving member, fixed support means on said frame structure adjacent one end of said sickle bar and adjacent the forward end of said second shaft, said fixed support means being disposed totally rearwardly of said sickle bar, a rocker member disposed forwardly of said fixed support means, pivot means drivingly connecting a predetermined point on said rocker member to said sickle bar, a pair of rocker arms each having one end pivotally mounted on said fixed support means, pivot members supporting said rocker member on the other ends of said pair of rocker arms for rocking oscillatory movement on said pair of arms, said predetermined point on said rocker member reciprocating in a straight line parallel to said sickle bar upon rocking oscillation of said rocker member on said pair of rocker arms, means interconnecting said rocker member and said crank and oscillating said rocker member on said rocker arms in response to oscillation of said crank, said rocker member comprising a two-piece yoke, one piece of said yoke rocker member receiving said pivot members which support the rocker member on said pair of rocker arms and having a leg extending along the rear side of said sickle bar, the other piece of said rocker member having a leg extending along the forward side of said sickle bar, said pivot means which drivingly connects the rocker member to said sickle bar extending through said legs and through said sickle bar, and bolt means spaced from said rocker member supporting pivot members and removably attaching said other piece of said yoke member to the forward side of said one piece of said yoke member to facilitate removal of said sickle bar from the forward side of said header.

References Cited

UNITED STATES PATENTS

| | | | |
|---|---|---|---|
| 796,268 | 8/1905 | Troeger | 56—158 |
| 2,297,317 | 9/1942 | Paradise et al. | 56—158 |
| 2,513,111 | 6/1950 | Schiller | 56—23 |
| 2,700,859 | 2/1955 | Vigum et al. | 56—23 |
| 2,742,753 | 4/1956 | Hardman | 56—296 |
| 3,113,412 | 12/1963 | Halls | 56—296 |
| 3,151,429 | 10/1964 | Dyrdahl | 56—23 |

ABRAHAM G. STONE, *Primary Examiner.*

P. A. RAZZANO, *Assistant Examiner.*